United States Patent Office 2,999,774
Patented Sept. 12, 1961

2,999,774
PRODUCTION OF SOIL-RESISTANT MATERIAL
Joseph W. Schappel, Morton, Pa., assignor to American Viscose Corporation, Philadelphia, Pa., a corporation of Delaware
No Drawing. Filed Dec. 18, 1956, Ser. No. 628,965
8 Claims. (Cl. 117—139.5)

The present invention relates to improvements in the application of silica to cellulose products and more particularly to the preparation of cellulose fibers such as filaments and staple fibers of viscose rayon having improved resistance to soiling. This application is a continuation-in-part of my copending application Serial No. 588,216, filed May 31, 1956, now abandoned.

It has heretofore been suggested to coat cellulose fibers with deposits of finely divided silica to improve their slip resistance and their resistance to soiling. Also, various procedures have been suggested for the preparation of such silica coated fibers. For example, the prior art teaches the application of colloidal silica to the exposed pile portion of pile fabrics by spraying, brushing, etc., which results in a coating of the fibers which deteriorates substantially with successive cleaning treatments. Other examples of the prior art which disclose the application of colloidal silica have been exhaustively studied, but have failed to yield teachings which might be followed to obtain sufficient pick-up of silica particles by the fibers and adherence thereto to provide satisfactory soil resistance through a service period including a number of cleaning treatments. One of such examples of the prior art discloses the treatment of fibers in a bath containing a cationic surface-active agent and an inorganic salt, and then treatment in a dilute aqueous bath of colloidal silica. Although the cationic material is supposed to promote the deposition of silica on the fiber, and the inorganic salt is present to aid in the deposition of the silica and to promote the fixation thereof, attempts to date to operate this two-bath process in a continuous manner have failed to give fibers loaded with sufficient permanently-fixed silica particles to effect soil resistance in accordance with standards desired in practicing the present invention.

Thus, it is a primary object of the present invention to provide silica-coated fibers and a method of producing them, such fibers being characterized by sufficient silica carried thereon to provide outstanding resistance to soiling, and by the improved adherence of the silica material to the fibers. Auxiliary to the foregoing object, it is a further object to provide a method for applying silica to cellulosic fibers in a simple one-step procedure. It is desired, moreover, that such procedure be applicable to the manufacturing of the fibers during an early stage thereof. A more specific object is to provide rayon fibers suitable for use in forming the pile of pile fabrics, such as carpets, plushes, and velvets, or the flock of flocked fabrics or other flocked products. Other objects, features and advantages will become apparent from the description of the invention which follows.

These and other objects are obtained by treating the cellulose products with an aqueous colloidal suspension of grown silica particles or aggregates to which, prior to growth, has been added a small amount of a salt of a multivalent metal.

The aqueous colloidal suspension of grown silica is prepared through the addition of the multivalent metal salt to silica sols of substantially smaller particle size. The presence of the multivalent metal ions causes the silica to grow or aggregate to give a solution in which at least 90 percent of the silica is present in a form having an average particle size of about 0.5 to 1.5 microns, which size has been found to be well suited for the treatment of textile fibers, the preferred average size being about 0.8 to 1.2 microns. The presence of the multivalent metal ions also substantially improves the pick-up of silica by the cellulose and improves its adherence thereto. By this process, suspensions having the desired particle size can be prepared from silica sols of almost any smaller particle size including, though not restricted, to sizes of about 1 to 100 millimicrons. For the purpose of practicing the invention, however, the sols generally commercially available are used. These range in average particle size from about 12 to 20 millimicrons.

In preparing the colloidal silica treating solutions of the present invention, it is necessary after the multivalent metal salt has been added to the silica sol to permit the resulting composition to age until the formation of the larger particle size colloidal product has been obtained. It is interesting to note that though it may take from a few minutes to several hours, depending on the particular concentration and multivalent salt used, to complete the formation of the larger particle size silica, further growth to an average particle size much above about 1.5 microns does not occur to any appreciable extent. As a result, the treating suspension once formed may be permitted to stand for substantial periods of time. Though appreciable settling-out of the larger silica particle sizes or aggregates may occur on standing, this is apparently not detrimental and slight agitation is all that is needed to again disperse the silica particles or aggregates in the aqueous media.

Although the process of the present invention contemplates the use of any multivalent metal salt other than basic aluminum salts such as basic aluminum formate and basic aluminum chloride, it is generally preferred, particularly for the treatment of regenerated cellulose fibers for improvement in soil resistance, to use aluminum salts since aluminum imparts no color to the treated fibers as would result from the use of other metals such as iron or copper. Examples of metal salts suitable for practicing the invention include aluminum formate, aluminum acetate, aluminum chloride, zinc chloride, zinc acetate, magnesium chloride, magnesium sulfate, ferric chloride, and cupric sulfate. Aluminum sulfate, including its double salts commonly referred to as alums, is generally preferred and will be used in the following more detailed description of the invention.

Colloidal silica products that are commercially available in quantity and are satisfactory for practicing the present invention include such products as "Ludox" (made by E. I. du Pont de Nemours & Co.) and "Syton" (made by Monsanto Chemical Co.). These products are procurable as concentrated dispersions of particle size under 50 millimicrons. Among the preferred silica sols used for practicing the present invention are the "Ludox" colloidal aqueous sols containing about 30 percent colloidal silica of particle sizes in the range of about 15 to 20 millimicrons in diameter, about 0.30 percent sodium oxide and up to about 0.15 percent sodium sulfate. These sols have an approximate pH range of about 8.5 to 10.5.

It has been found, in investigations leading to the present invention, that the optimum average particle size of the silica aggregates for treating regenerated cellulose is approximately 1 micron in diameter, i.e., between 0.8 and 1.2 microns. An extremely uniform particle size is difficult to achieve, but dispersions in which the high preponderance of particles having sizes in the ranges named above and averaging closely to about 1 micron are readily obtainable in practicing this invention and are highly satisfactory. This average particle size value is desired because dispersions that may be employed for applying it to the fibers are more unstable if the average size is substantially larger than 1 micron, and the retention of the silica at larger particle sizes is somewhat lessened. The silica processing solutions preferred in this invention, however, are characterized by a slight instability, i.e., a tendency for the silica to settle out on standing. This minor amount of settling is not objectionable since the silica bath is normally agitated and the silica is maintained in suspension by the movement of fibrous material therethrough, and by the supplying and withdrawal of solution from the bath. Although it is recognized that the actual treating composition is not a true solution, but rather, a macro colloidal suspension of finely divided silica particles or aggregates in which appreciable settling may occur when quiescent, for ease of describing the present invention it will be referred to as a treating solution.

From the foregoing, it is apparent that the manner in which the silica dispersion is prepared before contact with the fibers is an essential feature of the invention. An important step apparently not heretofore appreciated is that the silica solution, a sol, must be sufficiently aged after addition of the hydrolizable multivalent metal salt before application to the fibers in order to have particles of satisfactory uniformity and size within the treating bath before use. Though the aging period will vary somewhat with the particular multivalent metal salt added, for aluminum salts such as $Al_2(SO_4)_3$ and the alums satisfactory particle size and size distribution can be obtained with aging about 3 hours. However, greater uniformity of particle size may be obtained by longer aging, such as for a period of about 6 hours. Particle size may be controlled to some degree by the concentration of the ingredients mixed to form the silica bath for treating the fibers. The silica treating solutions when ready for use preferably have a silica content, based on the weight of the solution of about 0.05 to about 0.15 percent though treating solutions with silica content as high as 0.3 percent silica may be used. Where the aggregating salt is an aluminum salt, such as aluminum sulfate or alum, it should be used in amounts such that the aluminum is present in the treating solution, calculated on the basis of $Al_2O_3$, in amounts of about 0.005 to 0.38 percent and preferably in amounts of 0.0076 to 0.26 percent. Converting this to percent by weight of the salt, where the salt added is $Al_2(SO_4)_3 \cdot 18H_2O$, which is the form in which aluminum sulfate is most readily available, the broad range would be about 0.03 to 0.25 by weight of the solution and the preferred range 0.05 percent to 0.15 percent. At the upper limits of the above broad ranges in the concentrations of either or both silica and aluminum sulfate, a suspension is formed that has a heavy colloidal appearance. If the concentration of aluminum sulfate is increased to, for example, 0.10 percent while using 0.05 percent of silica, an unstable dispersion is formed which results in a light precipitate. If larger percentages of silica are used with 0.10 percent of aluminum sulfate, still more unstable dispersions and heavier precipitates are formed. However, the precipitate is readily dispersed and its formation appears to have no detrimental effect. The pH of the silica bath at the recommended concentration of the ingredients lies within an approximate range of from about 4 to 5.

Although one of the effects of adding multivalent metal salts to commercial silica sols is to build up the particle size to a size range that appears to be highly beneficial for treating cellulose products, the presence of multivalent metal ions such as aluminum also substantially improves the degree of silica exhaustion onto the cellulose and the adhesion of the silica to the cellulose. Treating cellulose fibers with aqueous silica suspension in which the silica has been reduced, for example by grinding, to a particle size of about one (1) micron will not give equivalent results even though the suspension has been acidified to a pH of 4 to 5. The presence of the multivalent metal ion is necessary to obtain the excellent adhesion between the silica and the cellulose obtained by the process of the present invention. This improved adhesion of the silica deposit and improved exhaustion of the silica onto the cellulose surface combine to give treated cellulose fibers having excellent soil resistant properties which are retained even after repeated washings.

For the best results, the fibers should be treated to render them soil-resistant while in the gel or so-called "green state." That is to say, they are thoroughly wetted with the silica solution at a stage in which they have attained a substantially regenerated state after spinning, but before they are dried to a point of equilibrium with atmospheric moisture. By treating in the "green state," a still further improvement in the retention of the silica by the cellulose is obtained. However, even though in preferred practice the regenerated cellulose is treated in the "green state," regenerated cellulose fibers which have been dried, may be rewetted and treated with solutions of the present invention and a substantial improvement in soil resistance obtained.

In applying the silica treating solution, the fibers are thoroughly wet with the treating solution for a period of about 2 to 30 minutes. A period of 2 minutes is sufficient for a continuous process although the period may be extended insofar as practical up to 30 minutes to insure the effectiveness of the deposition of silica. Longer periods, though not detrimental, serve no useful purpose. Thereafter, excess suspension is squeezed from the fibers such as by passing the fibers between a pair of nip rolls. The fibers may then be dried at any temperature up to about 225° F. Generally, higher drying temperatures should be avoided, particularly where the multivalent metal ion has been added in the form of a sulfate such as $Al_2(SO_4)_3 \cdot 18H_2O$.

In practice of the present invention an initial silica pick-up of about 1 percent by weight silica content of the fibers is regarded as generally preferred. At pick-up values of about 2 percent, some silica may tend to dust out of the fibers. This is generally objectionable, though for some purposes pick-up values as high as 3 percent silica may be used. The lower limit of silica for effective improvement in non-soiling properties is about 0.3 percent. Lower amounts can of course be used but, for the prevention of soiling, are generally not sufficient to give wholly satisfactory results though some protection is obtained. When the fiber is dyed after the silica treatment a reduction in silica content of as much as 50 percent may result. However, this is a substantial improvement in silica retention over the prior art methods noted and still leaves the fibers with sufficient silica to substantially improve their resistance to soiling.

The fibers which acquire silica in accordance with the teaching of this invention will normally require a lubricating-type finish for satisfactory processing in yarns and fabrics. The finish to be applied is preferably non-ionic. Examples of such finishes are sorbitol esters of palmitic and lauric acids, sorbitol monopalmitate, sorbitol monolaurate and sorbitan monleate. These are used in the form of aqueous emulsions together with any suitable emulsifying agent such as polyoxyethylene modified sorbitan tristearate. Such finishes are conventionally applied in aqueous baths containing 0.1 to 2 percent of the finish material. Though the finish ingredients may be incorporated in the silica treating solution, it is preferred to use a separate bath for application of the finishing ingredients after the silica has been applied. This may be, and is preferably done prior to drying the fibers. In practice, it is generally preferred to rinse the fibers after leaving the silica solution and the nip rolls so as to avoid dragging silica solution into the bath containing the finishing ingredients. Where the finishing ingredients are incorporated into the silica solution there is some tendency to inhibit silica pick-up of the fibers and to render the silica coating less fixed and more subject to loss through laundering.

The following examples will serve to further illustrate the invention:

EXAMPLE I

Fiber treating baths were made up by mixing aluminum sulfate and a concentrated solution of colloidal silica (average particle size 18 millimicrons) with a concentration of silica varying from 0.05 to 0.15 percent, and the aluminum sulfate (calculated on the basis of $$Al_2(SO_4)_3 \cdot 18H_2O$$

varying over a similar range of concentrations. The solutions were permitted to age for 3 hours for the development of particle size before application to the fiber. Separate staple masses were treated in each of the solutions. The typical treatment involved circulating the bath through the staple mass for a 10-minute period with the amount of the bath being at least 20 times greater than the amount of the fiber by weight. Table A specifies the concentration of silica and aluminum sulfate used with each sample, the appearance of the resulting silica bath, and the silica pick-up expressed as percent by weight silica of treated fiber.

Table A

| Sample | Percent $SiO_2$ | Percent $Al_2(SO_4)_3 \cdot 18H_2O$ | Appearance | Silica Pick-up of $SiO_2$ in Fiber |
|---|---|---|---|---|
| 1 | .05 | .05 | Clear Colloid | 0.71 |
| 2 | .10 | .05 | Med. Colloid | 1.10 |
| 3 | .15 | .05 | Heavy Colloid | 1.45 |
| 4 | .05 | .10 | Very Light Prec. | 0.73 |
| 5 | .10 | .10 | Med. Precip. | 0.87 |
| 6 | .15 | .10 | Heavy Precip. | 0.87 |
| 7 | .05 | .15 | ...do... | 0.52 |
| 8 | .10 | .15 | ...do... | 0.57 |
| 9 | .15 | .15 | ...do... | 0.75 |

Each sample or mass of fiber was centrifuged and dried at 225° F. Thereafter, a fatty acid ester of sorbitol finish was applied by circulating 0.15 percent solution through the staple. The staple was squeezed and dried the second time. All samples were dried and examined for silica pick-up, silica retention, and processability characteristics. After vigorous washing at 140° F., the fibers showed substantial retention of silica and good soil resistance. Sample 3 exhibited the best all-round properties with respect to soil resistance, silica retention and processability characteristics. The silica bath applied to Sample 3 was characterized by a fine dispersion which tended to settle out over a 24-hour period but was readily redispersed. This condition was found to coincide with and to indicate, as observed by microscopic counting, an average particle size of approximately 1 micron in which a very small fraction by weight of the particles had a size substantially less than about 0.5 micron or greater than about 1.5 microns. The finish staple, which was soft and processable, had by analysis 1.45 percent silica.

EXAMPLE II

A solution for applying silica to fibers was prepared by mixing aluminum sulfate, i.e., $Al_2(SO_4)_3 \cdot 18H_2O$, water, and a commercially obtainable colloidal silica solution of which the silica had an average particle size of 18 millimicrons in such proportion as to provide a silica concentration of 0.05 percent and an aluminum sulfate concentration of 0.15 percent (calculated on the basis of $Al_2(SO_4)_3 \cdot 18H_2O$). The solution was aged for at least three hours during which time the silica particles aggregated to form larger particles averaging in diameter about 0.9 of a micron. The sizes of the particles were determined by microscopic counting, and it was found that substantially more than half the particles by weight had a particle size greater than 0.8 micron and less than 1.2 microns. Less than 0.3 percent by weight of the particles was represented by sizes outside the range of 0.5 micron to 1.5 microns. Wet carpet fiber was admitted to a bath of the solution just described in a ratio of 1 part fiber to 25 parts of the bath. The treating temperature was 45° C. After the fiber had been immersed in the bath about 10 minutes, the fibers were squeezed, rinsed in water, and dried at about 100° C. The fibers were analyzed for silica before and after dyeing with various direct dyes named immediately below.

|  | Percent silica |
|---|---|
| Silica treated fiber | .76 |
| Silica treated fibers dyed with Chlorantine F (Brown BRL), color index No. P47 | .35 |
| Silica treated fibers dyed with Brilliant Benzo (Blue 6BA), color index No. 518 | .34 |

In their dried state, the silica-treated fibers of this example showed no tendency to discharge dust.

EXAMPLE III

Fifteen denier bright crimped rayon fibers were treated according to the procedure described in Example II except that various samples of the fibers were treated separately with treating solutions made up in accordance with the concentrations indicated in Table B below:

Table B

| Percent Silica in Solution | Percent Aluminum Sulfate in Solution | Percent Silica on the Fibers |
|---|---|---|
| .05 | .05 | .81 |
| .15 | .05 | 1.63 |
| .05 | .10 | .75 |
| .15 | .10 | 1.16 |
| .05 | .15 | .59 |
| .15 | .15 | .91 |

From the data provided in Table B, it will be observed that the greatest deposition was obtained in the fiber samples treated with solutions in which the aluminum sulfate content was low relative to the silica content [$Al_2(SO_4)_3$ content calculated on the basis of $Al_2(SO_4)_3 \cdot 18H_2O$].

EXAMPLE IV

A silica treating solution was prepared at a silica concentration of .15 percent and an aluminum sulfate [based on $Al_2(SO_4)_3 \cdot 18H_2O$] concentration of 0.10 percent. The solution was aged 3 hours to obtain a particle size of approximately 1 micron and then applied to 15 denier dull crimped viscose staple by showering the solution over the fibers while carried on a conveyor. A sample of the solution showed a tendency of the silica aggregations to settle over a 24-hour period. The application of the solution to the fibers was made at 45° C. and was continued for 10 minutes. The staple fibers were centrifuged and dried at 100° C. Thereafter, the fibers were treated with a lubricating finish comprising a sorbitol fatty acid ester for making the fibers more processable.

The staple fibers were formed into yarn which in turn was made into tufted carpet samples. A carpet sample was dyed in a dye beck in a conventional manner. Analysis of the carpet fiber for silica was made before and after dyeing. The silica values of the carpet were as follows:

|  | Percent |
|---|---|
| After opening (by cotton processing) | 1.13 |
| After tufting (carpet sample) | 1.10 |
| After dyeing (carpet sample) | 0.40 |

Samples of carpets comprising silica-treated undyed fibers, silica-treated dyed fibers, and untreated fibers were subjected to a service floor test. Substantial improvement in soil resistance over the carpet sample of untreated fibers was observed in the carpet samples made of silica-treated fibers. The undyed sample having the greater silica content was found to be the least soiled,

EXAMPLE V

A solution for treating fibers was prepared having a concentration of 0.10 percent of silica and 0.05 percent of alum $(Al_2(SO_4)_3.K_2SO_4.24H_2O)$. The solution was aged 5 hours and then applied in the form of a shower to a blanket of viscose staple fibers continuously for a period of 5 minutes. Staple fibers were centrifuged and dried at 80° C. The fibers were found to have gained 0.9 percent in weight as the result of silica pick-up. The fibers were thereafter washed and dried to ascertain the ability thereof to retain silica. On being reweighed, the silica content was found to be about 0.75 percent. The fibers were tested in the laboratory along with a control sample for soil retention and found to retain substantially less of the soiling material than the control sample. The silica solution prepared in accordance with this example showed a tendency to settle on standing for a 24-hour period, but the silica was readily resuspended by slight agitation of the suspension.

EXAMPLE VI

A solution having a concentration of 0.15 percent silica and 0.20 percent $Al(C_2H_3O_2)_3$ equivalent to 0.10 percent $Al_2O_3$ was prepared for treating fibers. The solution was aged for 3 hours after which rayon carpet fibers were immersed in the solution for 10 minutes at 45° C., agitating the fibers during the treatment. The fibers were squeezed to a weight equivalent to 200 percent of their dry weight, rinsed in water, centrifuged and dried at 100° C. Analysis of the fibers showed a pickup of 0.85 percent $SiO_2$. Application of a sorbitol fatty acid ester finish in a concentration of 0.1 percent softened the fibers sufficiently to permit processing without dusting of the $SiO_2$ or fiber breakdown.

The foregoing examples illustrate the essential features of the invention as well as some of the manners in which the invention may be practiced. They show how silica in sufficient quantities to prevent soil resistance may be applied to fibers by first preparing a suspension of the silica comprising the disclosed ingredients in the desired proportions, and properly aging the solution before use in order to have the desired particle size. In this manner, the silica may be deposited on the fiber in the required amounts and in a manner such as to improve its adherence while using a single bath, thus avoiding the effort expended in carrying out the more complicated procedures of the prior art. It is believed that the character of the cation of the hydrolyzable salt used for aggregating the silica particles, the proportions of the ingredients, and adequate aging are all important with respect to obtaining efficient silica pickup and the retention thereof by the fibers.

Various changes and modifications may be made in practicing the invention without departing from the spirit and scope thereof and, therefore, the invention is not to be limited except as defined in the appended claims.

Having thus described my invention, I claim:

1. A continuous method of improving the soil resistance of regenerated cellulose comprising mixing an aqueous suspension of silica having a particle size of under 50 millimicrons with a hydrolizable, acidic, multi-valent metal salt selected from the group consisting of aluminum, zinc, magnesium, ferric and cupric salts, aging the mixture to form a bath containing from about 0.05 to about 0.30 percent by weight of silica, at least 90 percent of the latter mentioned silica having an average particle size of from about 0.5 to about 1.5 microns, continuously passing regenerated cellulose through said bath, removing excess bath fluid from said regenerated cellulose on leaving said bath, and thereafter drying said regenerated cellulose to fix retained silica particles thereon.

2. The method of claim 1 wherein said regenerated cellulose is passed through said bath prior to drying after being formed.

3. The method of claim 1 wherein said multi-valent metal salt is an aluminum salt.

4. The method of claim 1 wherein said multi-valent metal salt is an aluminum sulfate.

5. The method of claim 1 wherein said bath contains about 0.10 to about 0.15 percent silica and about 0.05 to about 0.10 percent by weight of aluminum sulfate.

6. The method of claim 5 wherein said bath contains silica at least 90 percent of which has an average particle size of from about 0.8 to about 1.2 microns.

7. A continuous method of improving the soil resistance of regenerated cellulose comprising mixing an aqueous suspension of silica having a particle size of under 50 millimicrons with aluminum sulfate, aging the mixture to form a bath containing from about 0.10 to about 0.15 percent by weight of silica, at least 90 percent of which has an average particle size of from about 0.8 to about 1.2 microns, and about 0.05 to about 0.10 percent by weight of the aluminum sulfate; continuously passing regenerated cellulose through said bath, removing excess bath fluid from said regenerated cellulose, then treating said regenerated celluluose with an aqueous bath containing a lubricating-type finish, and thereafter drying said regnerated cellulose to fix retained silica and lubricant thereon.

8. The method of claim 7 wherein said regenerated cellulose is passed through said bath prior to drying after being formed.

References Cited in the file of this patent

UNITED STATES PATENTS

| | | |
|---|---|---|
| 2,601,235 | Alexander et al. | June 24, 1952 |
| 2,680,721 | Broge et al. | June 8, 1954 |
| 2,734,835 | Florio et al. | Feb. 14, 1956 |
| 2,754,221 | Caroselli | July 10, 1956 |

FOREIGN PATENTS

| | | |
|---|---|---|
| 741,887 | Germany | Feb. 9, 1941 |
| 728,237 | Great Britain | Apr. 13, 1955 |
| 516,798 | Canada | Sept. 20, 1955 |